United States Patent [19]
Tsukagoshi

[11] Patent Number: 6,058,311
[45] Date of Patent: May 2, 2000

[54] IDENTIFICATION OF MOBILE STATION

[75] Inventor: Tsutomu Tsukagoshi, Tokyo, Japan

[73] Assignee: NEC Corporation, Japan

[21] Appl. No.: 08/918,164

[22] Filed: Aug. 25, 1997

[30] Foreign Application Priority Data

Aug. 26, 1996 [JP] Japan .................................. 8-223438

[51] Int. Cl.[7] .................................................. H04Q 7/20
[52] U.S. Cl. .......................... 455/435; 455/432; 455/456; 455/433
[58] Field of Search .................................. 455/432, 426, 455/435, 456, 457, 433, 436, 437

[56] References Cited

U.S. PATENT DOCUMENTS

| | | | |
|---|---|---|---|
| 4,112,257 | 9/1978 | Frost | 455/437 |
| 5,729,537 | 3/1998 | Billstrom | 370/329 |
| 5,765,105 | 6/1998 | Kuriki | 455/410 |
| 5,818,824 | 10/1998 | Lu et al. | 370/328 |
| 5,907,802 | 5/1999 | Scott | 455/406 |

*Primary Examiner*—Daniel S. Hunter
*Assistant Examiner*—Yemane Woldetatios
*Attorney, Agent, or Firm*—Hayes, Soloway, Hennessey, Grossman & Hage, P.C.

[57] ABSTRACT

A temporary identifier which is assigned to a mobile station is changed in response to one of a location registration request, a call request, and an incoming call response which are transmitted from the mobile station to a network where the mobile station is located. Using such a frequently changed temporary identifier, the mobile station is identified by a home memory station.

16 Claims, 11 Drawing Sheets

INITIAL ASSIGNMENT

IDENTIFICATION OF MOBILE STATION

BACKGROUND OF THE INVENTION

1. Field of the Invention

The present invention generally relates to a mobile communications system, and in particular to a method and system for identifying a mobile communication station.

2. Description of the Related Art

In mobile communications, a mobile telephone user may move between different networks. Therefore, it is very important to support services without interruption in multiple networks. Such a capability is known as roaming. To realize the roaming, an identifier such as a subscriber number which identifies the mobile terminal is needed in each network to exchange the location and other necessary information of a mobile terminal between networks.

A roaming technique using a temporary number as an identifier has been disclosed in Japanese Patent Unexamined Publication No. 5-14271. In this roaming technique, when moving from a home network to an adjacent different network, a mobile terminal transmits its subscriber number and a roaming request to the visiting network and thereby the visiting network assigns a roaming umber as a temporary identifier to the mobile terminal. While the mobile terminal is located in the visiting network, the roaming number is used to provide services. When back to the home network, the mobile terminal uses the subscriber number to perform radio communications.

SUMMARY OF THE INVENTION

However, the conventional technique described above fails to provide sufficient security of the subscriber number. First, while locating in the home network, the mobile terminal always uses the same identifier, that is, the subscriber number to perform radio communications. When the same identifier is used for a long time, an outsider can easily know the user from that identifier by phone-tapping. When the mobile terminal enters another network, the roaming number is assigned by transmitting the subscriber number to a nearest base station of that network by radio. Therefore, there is a possibility that an outsider listens secretly to the subscriber number transmitted by radio.

An object of the present invention is to provide a method and system which can reduce the possibility that an outsider knows the unique identifier of a mobile station.

Another object of the present invention is to provide a method and system which can reduce the number of times the unique identifier is transmitted by radio so as to prevent tapping.

According to an aspect of the present invention, after assigning a temporary identifier to a mobile station, the temporary identifier is changed in response to one of a plurality of predetermined requests transmitted from the mobile station to a network where the mobile station is located. Using the temporary identifier, the mobile station is identified.

According to another aspect of the present invention, in a plurality of networks of different common carriers wherein each of the networks comprises a plurality of radio base stations and a home memory station which is connected to other home memory stations, the mobile station transmits a predetermined signal including a first temporary identifier to a radio base station connected to a first home memory station with the first temporary identifier assigned to the mobile station. The first home memory station changes the first temporary identifier to a second temporary identifier in response to the predetermined signal received from the mobile station. The first home memory station receives data of the mobile station including the unique identifier from a second home memory station of the home network to link the data of the mobile station with the second temporary identifier when the first temporary identifier is not registered in the first home memory station. The first home memory station transmits the second temporary identifier back to the mobile station to communicate with the mobile station using the second temporary identifier, and the identifies the mobile station according to the second temporary identifier when receiving a signal with the second temporary identifier from the mobile station.

According to the present invention, the number of times the unique identifier (or subscriber number) is transmitted by radio can be reduced. Ideally, the unique identifier is transmitted from the mobile station to the nearby radio base station only one time after the service contract. Further, the time period during which the same temporary identifier is used can be shortened. Ideally, the shortest period is a duration of one call.

DETAILED DESCRIPTION OF THE PREFERRED EMBODIMENTS

Figure 1A:
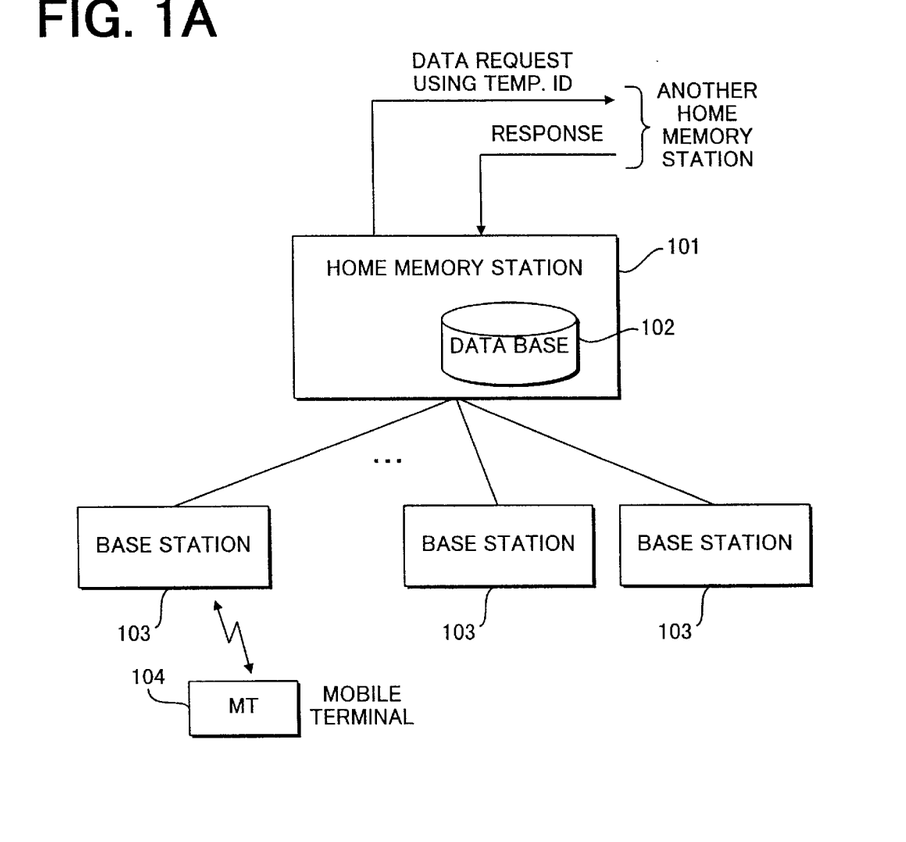
FIG. 1A is a schematic block diagram showing the configuration of a network including a home memory station and a plurality of base stations according to the present invention.

Referring to FIG. 1A, a home memory station 101 of a common carrier has a database 102 therein and a plurality of radio base stations 103. The database 102 stores and updates the location, identifiers including a subscriber number ID and a temporary identifier $ID_{TEMP}$, and other necessary information of each mobile station (here, a mobile terminal MT) 104 located in the service area of the home memory station 101. As will be described later, the home memory station 101 is provided with a data exchange interface with another home memory station through cables. Each base station 103 forms at least one location registration area (RA) and is capable of communicating with each mobile terminal 104 located therein through a radio channel.

The home memory station 101 administrates the assignment of a temporary identifier to a mobile terminal MT and stores the necessary data including the subscriber number of each mobile terminal MT onto the database 102 with linking the data with the temporary identifier. Therefore, the home memory station 101 can obtain the necessary data of the mobile terminal from another home memory station by using the temporary identifier. A new temporary identifier is assigned to a mobile terminal each time a predetermined condition is satisfied, for example, when the mobile terminal enters the network of another common carrier or another location registration area, or when a calling request is made by the mobile terminal. The details will be described later.

Figure 1B:
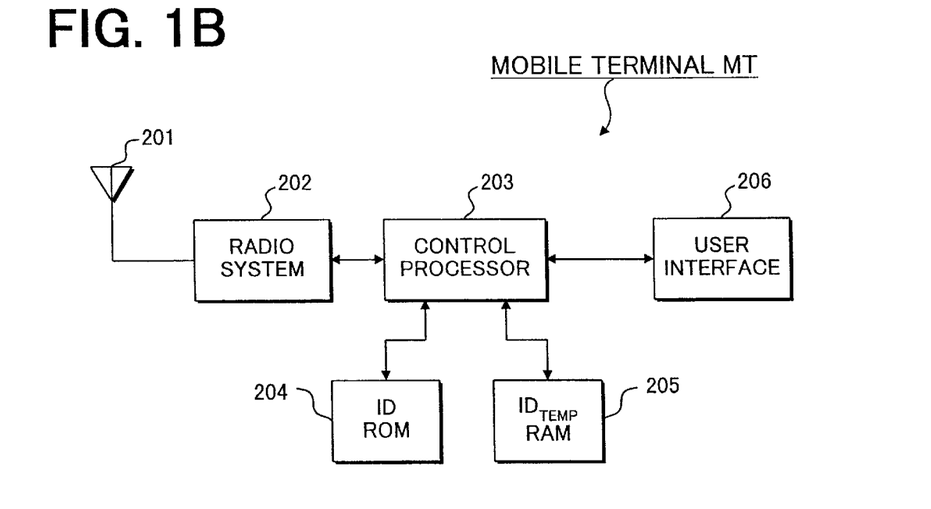
FIG. 1B is a schematic block diagram showing the configuration of a mobile terminal according to the present invention.

Referring to FIG. 1B, each mobile terminal MT is provided with an antenna 201 and a radio system 202 which receives and transmits a radio signal from and to a nearby base station 103. The mobile terminal MT is further provided with a control processor 203, a unique identifier memory (ID ROM) 204 and a temporary identifier memory ($ID_{TEMP}$ RAM) 205. The ID ROM 204 stores the subscriber number which was uniquely assigned to the mobile terminal. The $ID_{TEMP}$ RAM 205 stores a temporary identifier which will be frequently updated by the home memory station 101. After a temporary identifier has been assigned, the temporary identifier is normally used for radio communications in the service area of the network until updated. In the case of a mobile telephone, a user interface 206 may include a speaker, a microphone, a display, and a keypad.

Figure 2:
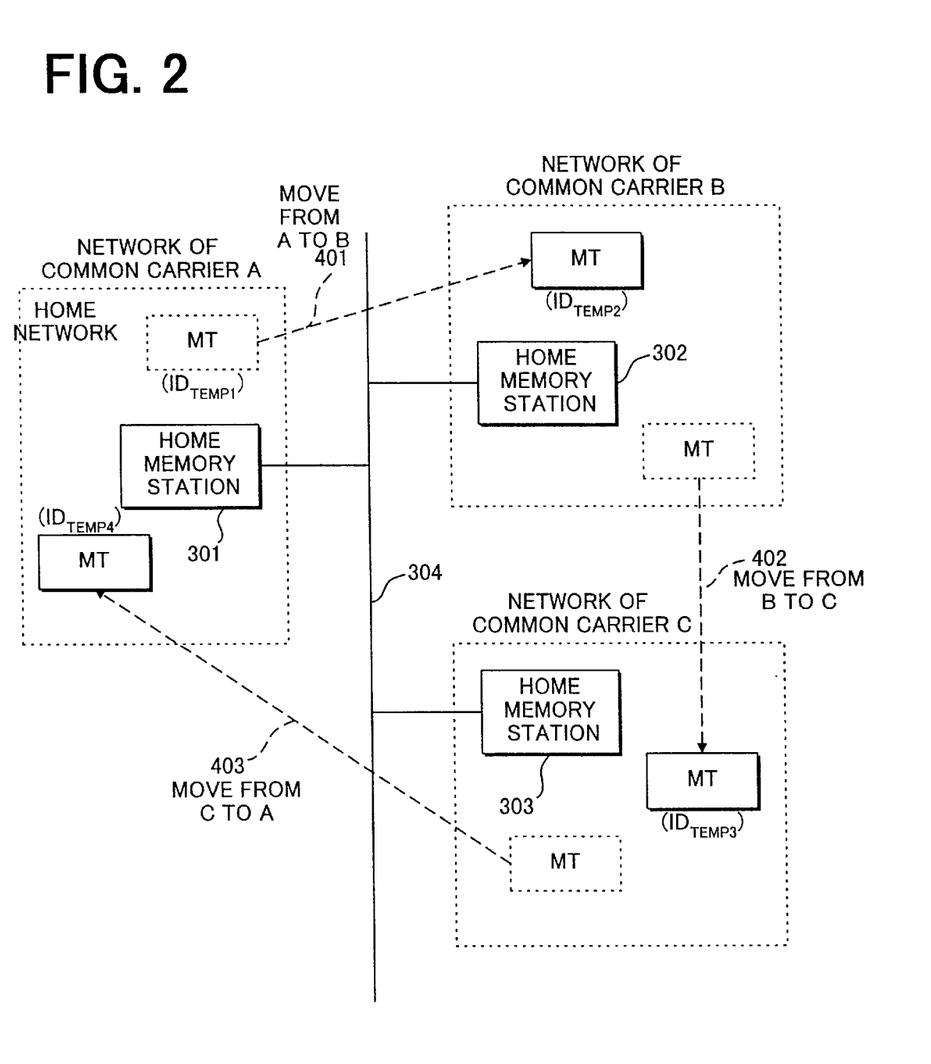
FIG. 2 is a block diagram showing the network configuration including a plurality of different networks to explain triggers of updating a temporary identifier according to the present invention.

Referring to FIG. 2, it is assumed for simplicity that a mobile terminal MT moves among three network service areas of different common carriers A, B and C and that the network of the common carrier A is the home network of the mobile terminal MT and the other networks are visiting network. The respective networks of the common carriers A, B and C are provided with home memory stations 301, 302, and 303 which are connected to each other through cables 304.

A temporary identifier is updated by triggers 401–403, that is, when moving from the home network to the network of the common carrier B, when moving from the network of the common carrier B to the network of the common carrier C, and when moving from the network of the common carrier C to the home network, respectively.

Figure 3:
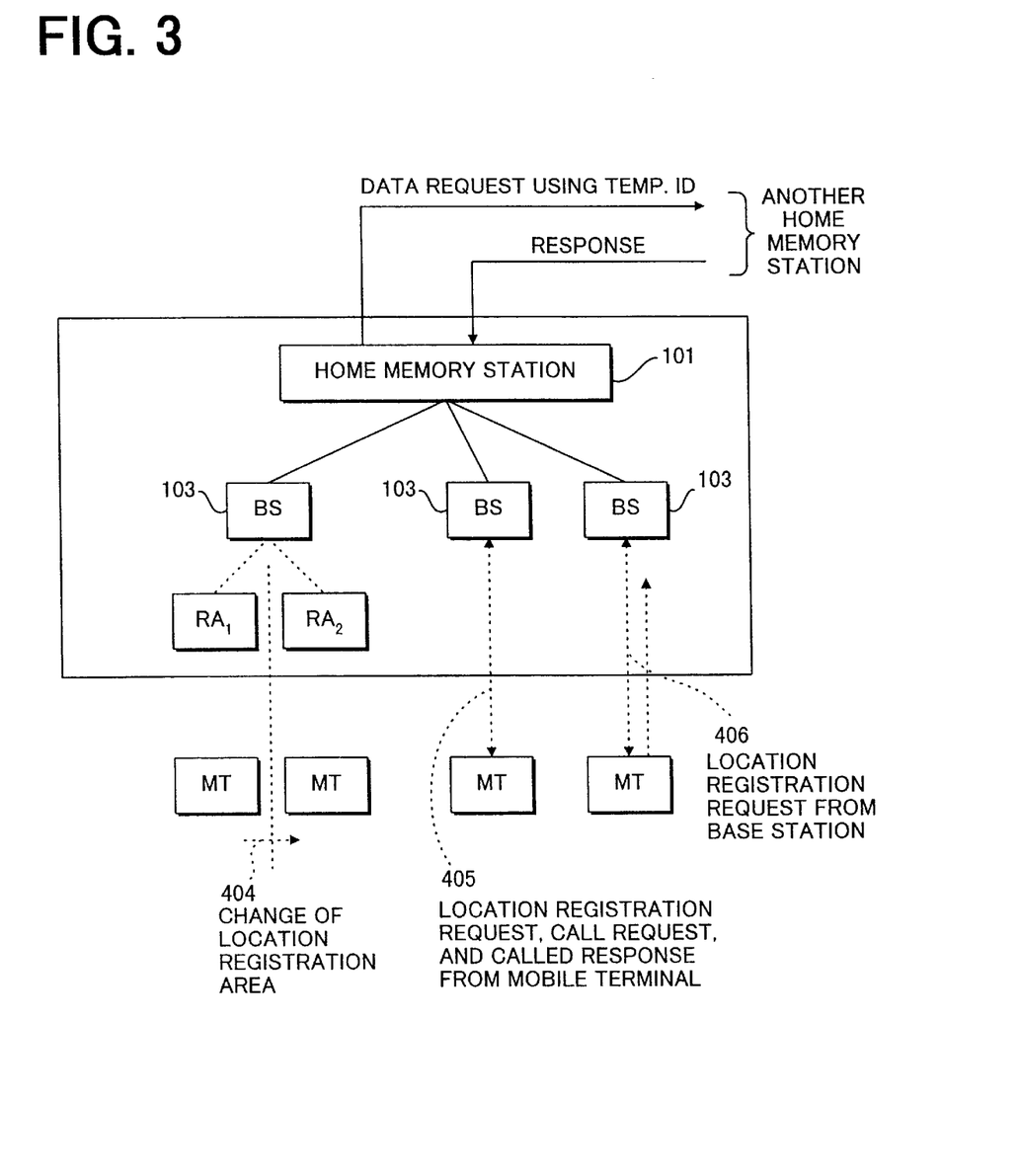
FIG. 3 is a block diagram showing the configuration of a single network to explain further triggers of updating a temporary identifier according to the present invention.

Referring to FIG. 3, there are shown further triggers 404–406 which cause the change of temporary identifier in the service area of a home memory station. The temporary identifier is changed when the mobile terminal MT moves from a location registration area $RA_1$ to an adjacent location registration area $RA_2$ (trigger 404). The temporary identifier is also changed when the mobile terminal MT requests the location registration at power-on, or when a calling request or a response to incoming call is made by the mobile terminal MT (trigger 405). Further, when the time-out period of the location registration has elapsed, the nearby base station requests the location registration of the mobile terminal MT and thereby the temporary identifier is updated (trigger 406).

In other words, location registration or call setup causes a temporary identifier to be updated. The details of updating temporary identifier will be described hereinafter.

Initial Assignment of Temporary Identifier

Figure 4:
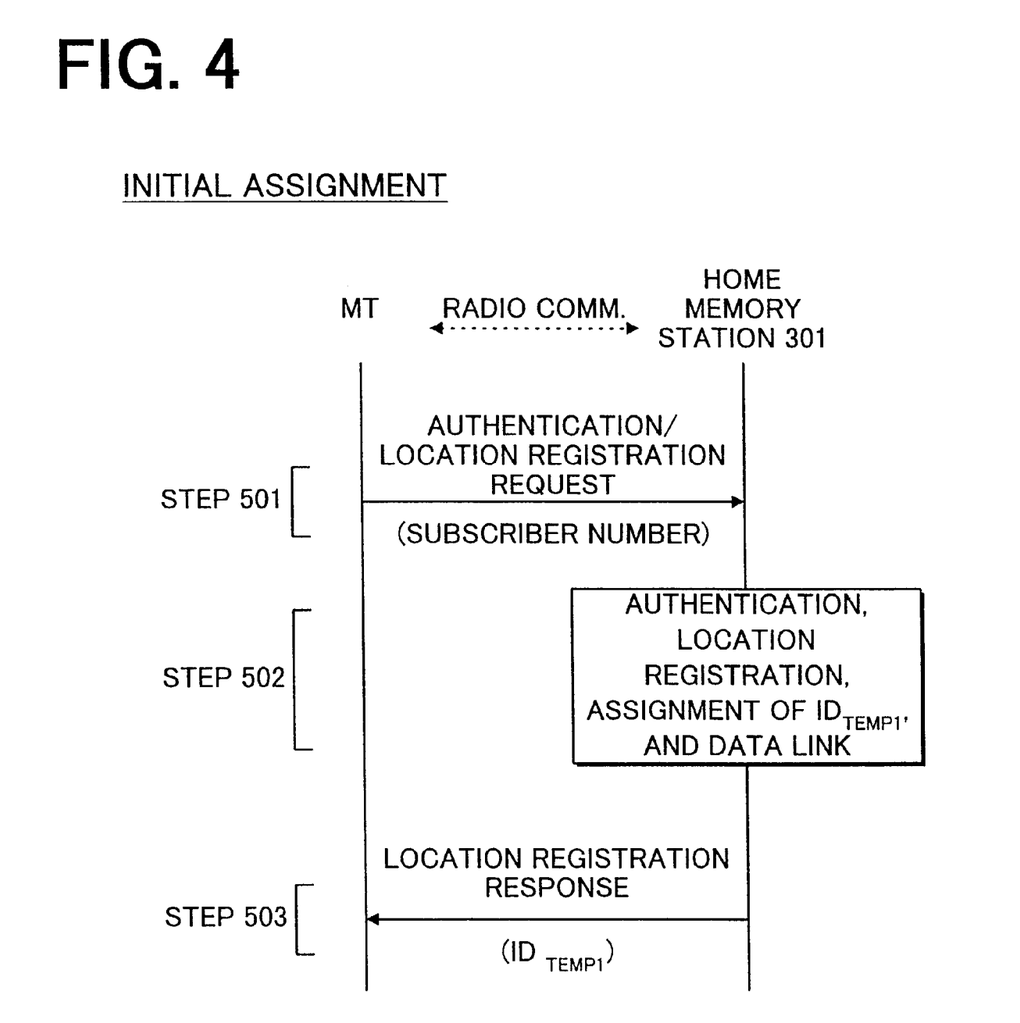
FIG. 4 is a diagram showing a sequence for initial assignment of a temporary identifier according to a first embodiment of the present invention.

Referring to FIG. 4, the mobile terminal MT is located in the service area of the home network and an initial location registration will be made after a service contract with the common carrier A. Since a temporary identifier is not assigned to the mobile terminal MT at this time, the mobile terminal MT transmits the authentication/location registration request using the unique identifier (subscriber number) to the home memory station 301 through the nearby base station (step 501). When receiving the authentication/location registration request and the subscriber number, the home memory station 301 authenticates terminal identification by retrieving the database according to the subscriber number, and then performs the location registration and the assignment of a temporary identifier $ID_{TEMP1}$ and links the data of the mobile terminal MT with the temporary identifier $ID_{TEMP1}$ in the database (step 502). After that, the home memory station 301 transmits the assigned temporary identifier $ID_{TEMP1}$ to the mobile terminal MT through the nearby base station (step 503). The assigned temporary identifier $ID_{TEMP1}$ is stored onto the $ID_{TEMP}$ RAM 205 of the mobile terminal MT. In this manner, a temporary identifier is initially assigned to the mobile terminal MT.

Updates of Temporary Identifier

Assuming that the temporary identifier $ID_{TEMP1}$ is assigned to the mobile terminal M in the home network of the common carrier A, the mobile terminal MT moves from the home network to the network of the common carrier B (trigger 401 of FIG. 2).

Figure 5:
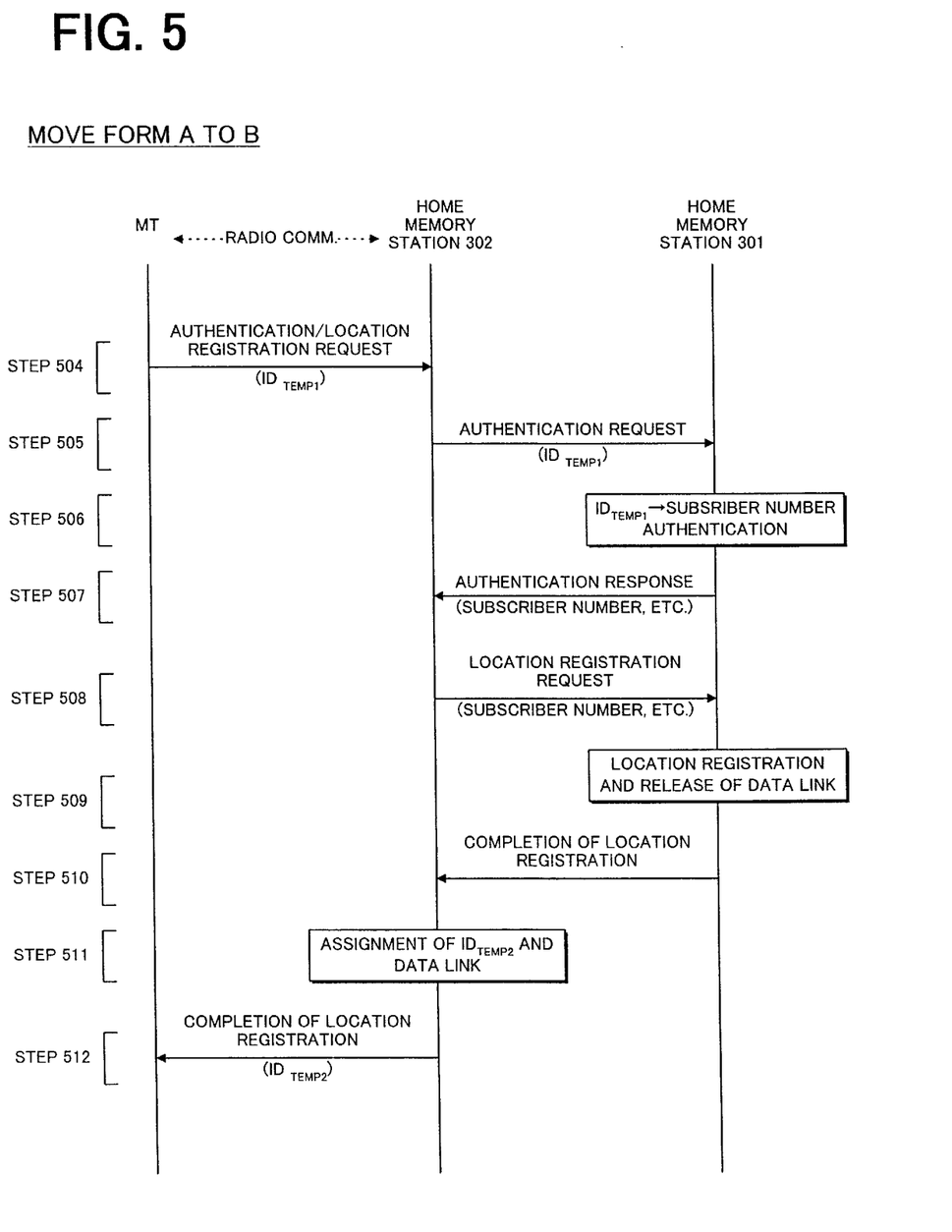
FIG. 5 is a diagram showing a sequence for updating of a temporary identifier when a mobile terminal moves from the home network to a visiting network according to the first embodiment.

Referring to FIG. 5, when the mobile terminal MT enters the network service area of the common carrier B, the mobile terminal MT transmits the authentication/location registration request using the temporary identifier $ID_{TEMP1}$ to the home memory station 302 of the common carrier B through the nearby base station (step 504). When receiving the authentication/location registration request and the temporary identifier $ID_{TEMP1}$, the home memory station 302 determines whether the temporary identifier $ID_{TEMP1}$ is registered therein. Since the temporary identifier $ID_{TEMP1}$ is not registered, the home memory station 302 transmits the authentication and data request using the temporary identifier $ID_{TEMP1}$ to the home memory station 301 of the home network through the cable 304 (step 505).

When receiving the authentication and data request of the temporary identifier $ID_{TEMP1}$, the home memory station 301 searches the database for the data of the mobile terminal MT including the subscriber number according to the temporary identifier $ID_{TEMP1}$. Since the temporary identifier $ID_{TEMP1}$ was assigned by the home memory station 301, the home memory station 301 authenticates the mobile terminal MT using the retrieved data (step 506), and then transmits the authentication response including the data of the mobile terminal MT to the home memory station 302 (step 507).

Subsequently, the home memory station 302 transmits the location registration request using the data including the subscriber number to the home memory station 301 (step 508). The home memory station 301 performs the location registration of the mobile terminal MT and then releases the data link of the temporary identifier $ID_{TEMP1}$ (step 509). After that, the response indicating the completion of location registration is transmitted back to the home memory station 302.

When receiving the completion notification of location registration, the home memory station 302 assigns a new temporary identifier $ID_{TEMP2}$ to the mobile terminal MT and links the data of the mobile terminal MT with the new temporary identifier $ID_{TEMP2}$ in the database (step 511). After that, the home memory station 302 transmits the completion notification of location registration and the temporary identifier $ID_{TEMP2}$ to the mobile terminal MT through the nearby base station (step 512). The assigned temporary identifier $ID_{TEMP2}$ is stored onto the $ID_{TEMP}$ RAM 205 of the mobile terminal MT and is normally used to access the visiting network of the common carrier B until updated.

Next, assuming that the temporary identifier $ID_{TEMP2}$ is assigned to the mobile terminal MT in the visiting network of the common carrier B, the mobile terminal MT moves from the visiting network to the other visiting network of the common carrier C (trigger 402 of FIG. 2).

Figure 6:
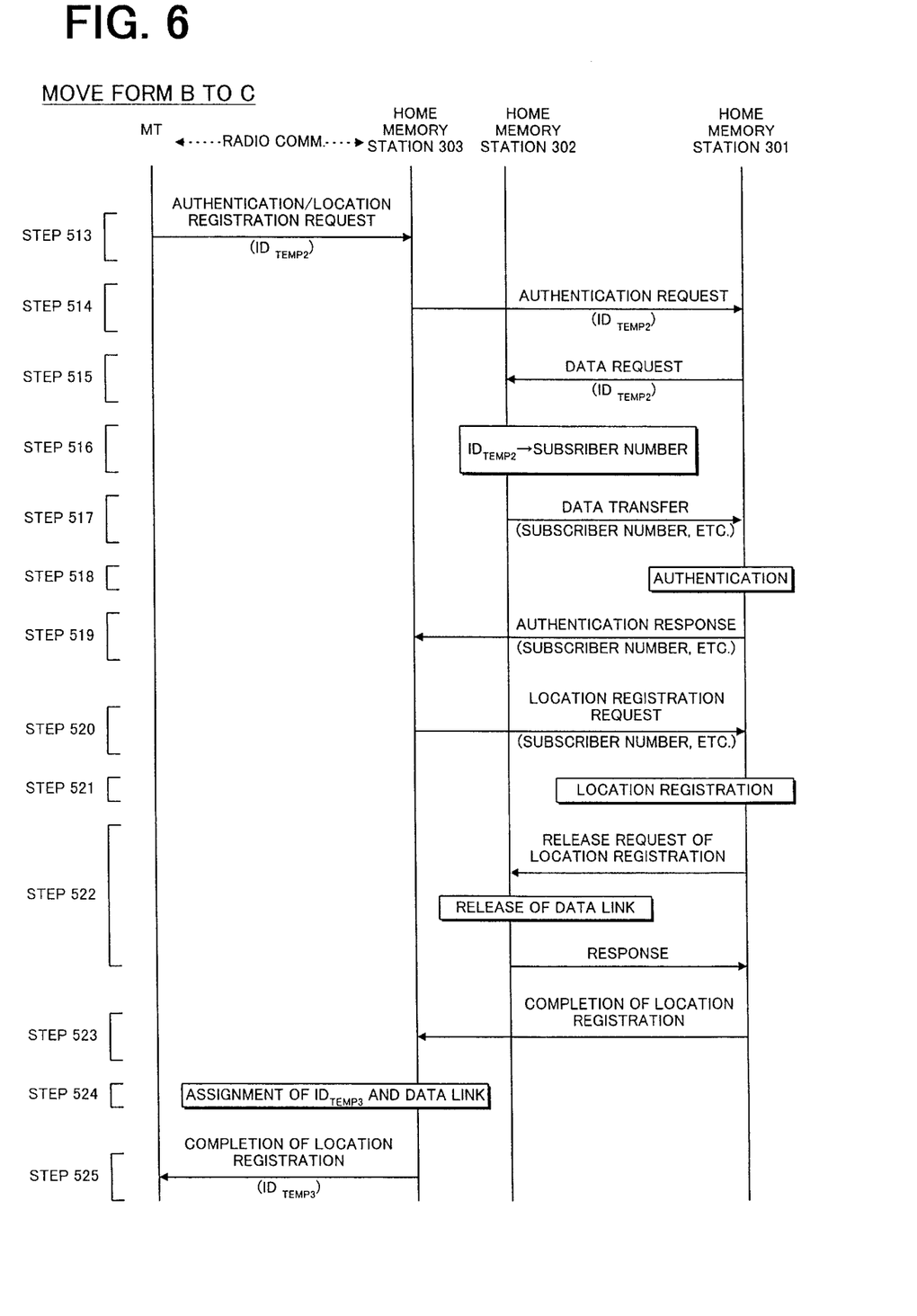
FIG. 6 is a diagram showing a sequence for updating of a temporary identifier when a mobile terminal moves from a visiting network to another visiting network according to the first embodiment.

Referring to FIG. 6, when the mobile terminal MT enters the network service area of the common carrier C and detects a change of network service area, the mobile terminal MT transmits the authentication/location registration request using the temporary identifier $ID_{TEMP2}$ to the home memory station 303 of the common carrier C through the nearby base station (step 513). When receiving the authentication/location registration request and the temporary identifier $ID_{TEMP2}$, the home memory station 303 determines whether the temporary identifier $ID_{TEMP2}$ is registered therein. Since the temporary identifier $ID_{TEMP2}$ is not registered, the home memory station 303 transmits the authentication and data request using the temporary identifier $ID_{TEMP2}$ to the home memory station 301 of the home network through the cable 304 (step 514).

Since the temporary identifier $ID_{TEMP2}$ was assigned by the home memory station 302, the home memory station 301 transmits the data request of the temporary identifier $ID_{TEMP2}$ to the home memory station 302 (step 515). In response to the data request, the home memory station 302 searches the database for the subscriber number and the data of the mobile terminal MT according to the temporary identifier $ID_{TEMP2}$ (step 516), and then transmits the data and the subscriber number back to the home memory station 301 (step 517). Subsequently, the home memory station 301 authenticates the mobile terminal MT using the retrieved data (step 518), and then transmits the authentication response including the data of the mobile terminal MT to the home memory station 303 (step 519).

When receiving the authentication response, the home memory station 303 transmits the location registration request using the data including the subscriber number to the home memory station 301 (step 520). This causes the home memory station 301 to perform the location registration of the mobile terminal MT (step 521). After that, the home memory station 301 transmits the release request of location registration to the home memory station 302 and, upon receipt of the release request of location registration, the home memory station 302 deletes the data and releases the data link of the temporary identifier $ID_{TEMP2}$ and then transmits the response back to the home memory station 301 (step 522). When receiving the response to the release request of location registration, the home memory station 301 transmits the response indicating the completion of location registration back to the home memory station 303 (step 523).

When receiving the completion notification of location registration, the home memory station 303 assigns a new temporary identifier $ID_{TEMP3}$ to the mobile terminal MT and links the data of the mobile terminal MT with the new temporary identifier $ID_{TEMP3}$ in the database (step 524). After that, the home memory station 303 transmits the completion notification of location registration and the temporary identifier $ID_{TEMP3}$ to the mobile terminal MT through the nearby base station (step 525). The assigned temporary identifier $ID_{TEMP3}$ is stored onto the $ID_{TEMP}$ RAM 205 of the mobile terminal MT and is normally used to access the visiting network of the common carrier C until updated.

Finally, assuming that the temporary identifier $ID_{TEMP3}$ is assigned to the mobile terminal MT in the visiting network of the common carrier C, the mobile terminal MT moves from the visiting network to the home network of the common carrier A (trigger 403 of FIG. 2).

Figure 7:
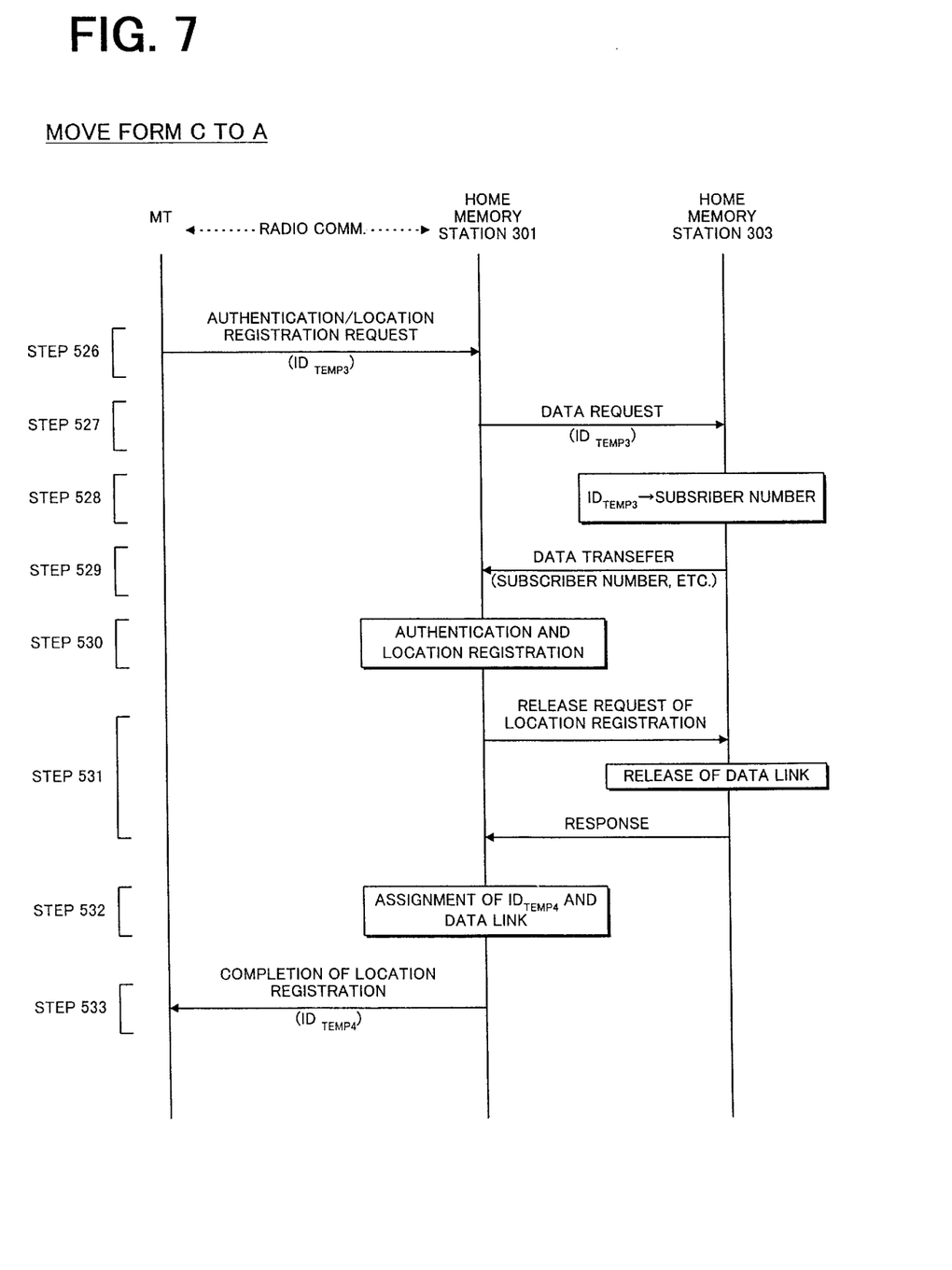
FIG. 7 is a diagram showing a sequence for updating of a temporary identifier when a mobile terminal moves from a visiting network to the home network according to the first embodiment.

Referring to FIG. 7, when the mobile terminal MT enters the home network and detects a change of network service area, the mobile terminal MT transmits the authentication/location registration request using the temporary identifier $ID_{TEMP3}$ to the home memory station 301 of the common carrier A through the nearby base station (step 526). Since the temporary identifier $ID_{TEMP3}$ was assigned by the home memory station 3023 the home memory station 301 transmits the data request of the temporary identifier $ID_{TEMP3}$ to the home memory station 303 (step 527). In response to the data request, the home memory station 303 searches the database for the subscriber number and the data of the mobile terminal MT according to the temporary identifier $ID_{TEMP3}$ (step 528), and then transmits the data and the subscriber number back to the home memory station 301 (step 529). Subsequently, the home memory station 301 performs the authentication and the location registration of the mobile terminal MT using the retrieved data (step 530), and then transmits the release request of location registration to the home memory station 303. Upon receipt of the release request of location registration, the home memory station 303 deletes the data and releases the data link of the temporary identifier $ID_{TEMP3}$ and then transmits the response back to the home memory station 301 (step 531). When receiving the response to the release request of location registration, the home memory station 301 assigns a temporary identifier $ID_{TEMP4}$ to the mobile terminal MT and links the data of the mobile terminal MT with the temporary identifier $ID_{TEMP4}$ in the database (step 532). After that, the home memory station 301 transmits the completion notification of location registration and the temporary identifier $ID_{TEMP4}$ to the mobile terminal MT through the nearby base station (step 533). The assigned temporary identifier $ID_{TEMP4}$ is stored onto the $ID_{TEMP}$ RAM 205 of the mobile terminal MT and is normally used to access the home network of the common carrier A until updated.

Further, the temporary identifier is changed when the mobile terminal MT moves from a location registration area RA₁ to an adjacent location registration area RA₂ (trigger 404) as shown in FIG. 3.

Figure 8A:
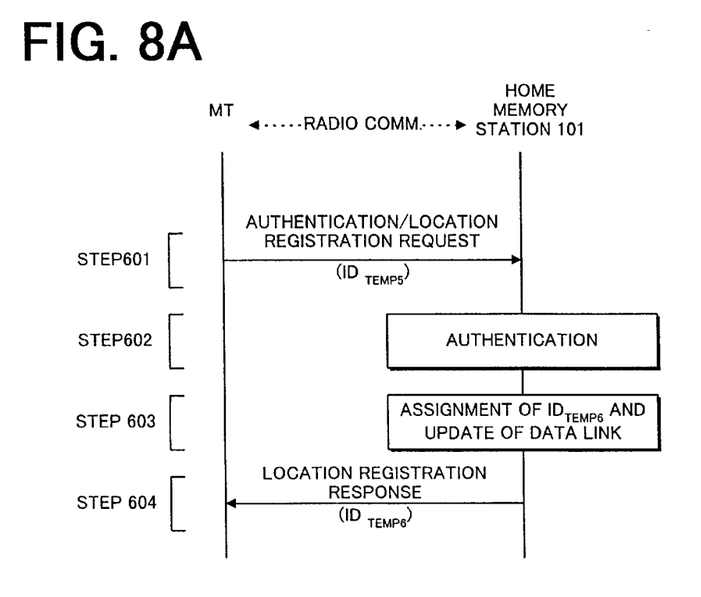
FIG. 8A is a diagram showing a sequence for updating of a temporary identifier when a mobile terminal moves from one location registration area to another according to the first embodiment.

Referring to FIG. 8A, when the mobile terminal MT enters the location registration area RA₂, the mobile terminal MT transmits the authentication/location registration request using the temporary identifier $ID_{TEMP5}$ which was assigned in the previous location registration area RA₁ to the home memory station 101 through the nearby base station 103 (step 601). When receiving the authentication/location registration request and the temporary identifier $ID_{TEMP5}$, the home memory station 101 performs the authentication/location registration (step 602) and the assignment of another temporary identifier $ID_{TEMP6}$ and links the data of the mobile terminal MT with the temporary identifier $ID_{TEMP6}$ in the database (step 603). After that, the home memory station 101 transmits the assigned temporary identifier $ID_{TEMP6}$ to the mobile terminal MT through the nearby base station (step 604). The assigned temporary identifier $ID_{TEMP6}$ is stored onto the $ID_{TEMP}$ RAM 205 of the mobile terminal MT. In this manner, a temporary identifier is updated to the mobile terminal MT.

The temporary identifier is also changed when the mobile terminal MT requests a call and transmits a response to incoming call (trigger 405) as shown in FIG. 3.

Figure 8B:
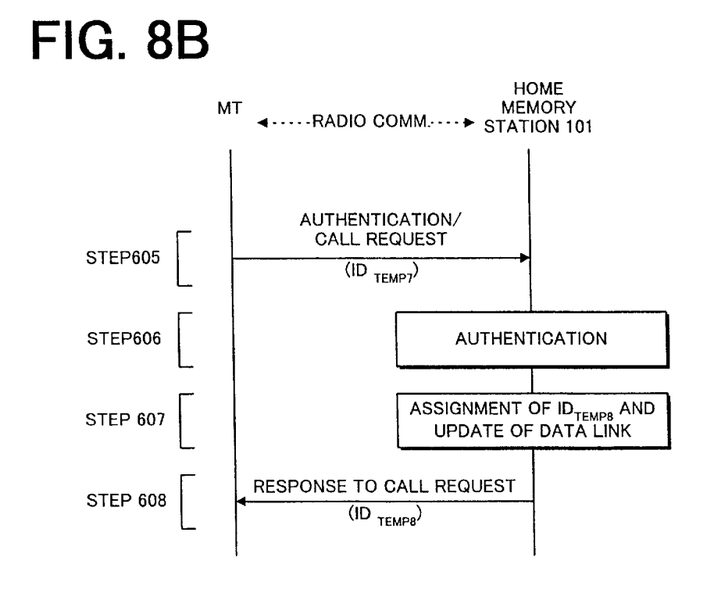
FIG. 8B is a diagram showing a call sequence when retaining a temporary identifier when a mobile terminal requests a call according to the first embodiment.

Referring to FIG. 8B, when the mobile terminal MT transmits an authentication/call request to the home memory station 101 through the nearby base station 103 using the temporary identifier $ID_{TEMP7}$ which was assigned in the present location registration area (step 605). When receiving the authentication/call request and the temporary identifier $ID_{TEMP7}$, the home memory station 101 performs the authentication (step 606) and, if it is necessary to update the temporary identifier, performs the assignment of another temporary identifier $ID_{TEMP8}$ and links the data of the mobile terminal MT with the temporary identifier $ID_{TEMP8}$ in the database (step 607). After that, the home memory station 101 transmits a response to the call request with the assigned temporary identifier $ID_{TEMP8}$ to the mobile terminal MT through the nearby base station (step 608). The assigned temporary identifier $ID_{TEMP8}$ is stored onto the $ID_{TEMP}$ RAM 205 of the mobile terminal MT. In this manner, a temporary identifier is updated to the mobile terminal MT when the mobile terminal MT requests a call.

Figure 8C:
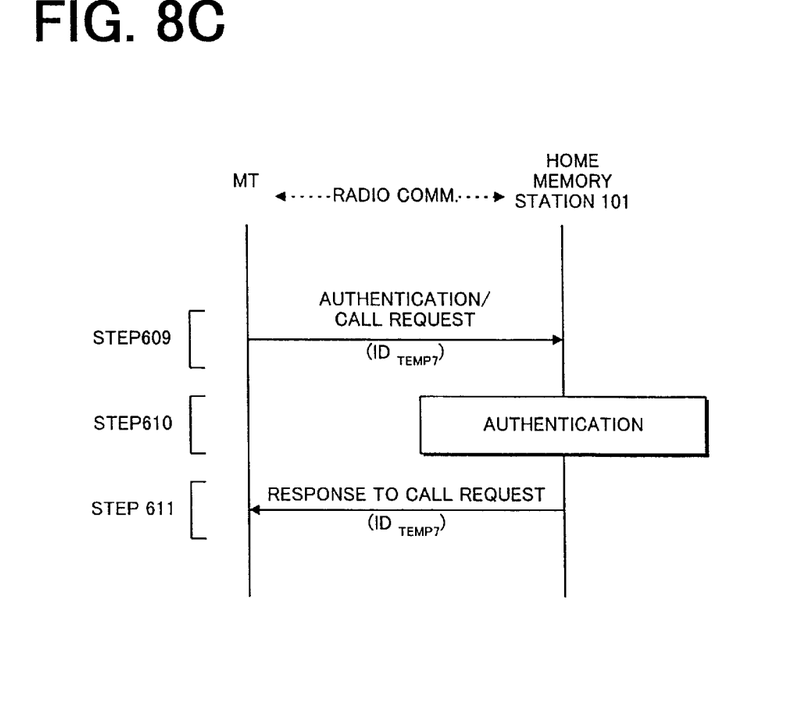
FIG. 8C is a diagram showing a call sequence when retaining a temporary identifier according to the first embodiment.

Referring to FIG. 8C, when the mobile terminal MT transmits an authentication/call request to the home memory station 101 through the nearby base station 103 using the temporary identifier $ID_{TEMP7}$ which was assigned in the present location registration area (step 609). When receiving the authentication/call request and the temporary identifier $ID_{TEMP7}$, the home memory station 101 performs the authentication (step 610). If it is not necessary to update the temporary identifier, the home memory station 101 transmits a response to the call request with the temporary identifier $ID_{TEMP7}$ to the mobile terminal MT through the nearby base station (step 611). Therefore, the temporary identifier $ID_{TEMP7}$ is used to access the present network until updated.

Figure 8D:
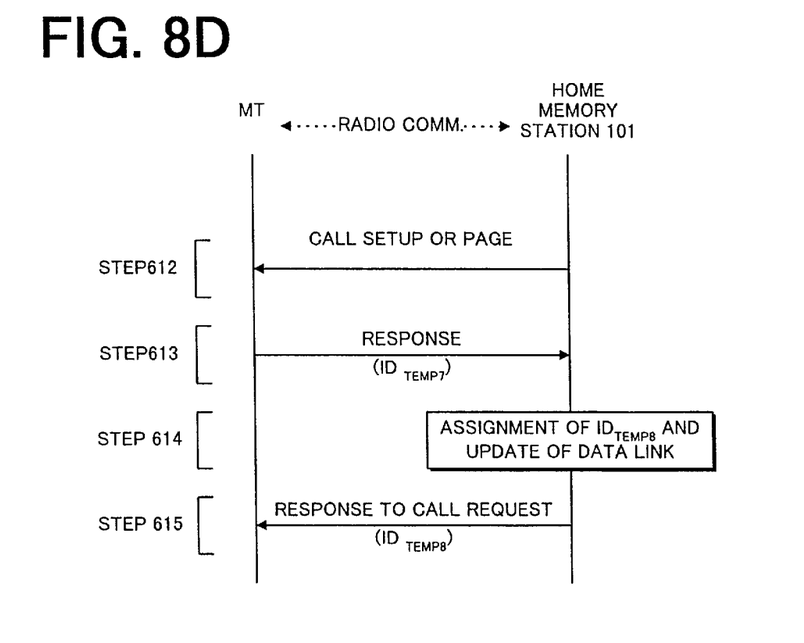
FIG. 8D is a diagram showing a sequence for updating of a temporary identifier when a mobile terminal receives an incoming call according to the first embodiment.

Referring to FIG. 8D, when an incoming call occurs in the home memory station 101, the home memory station 101 transmits a call setup or page to the mobile terminal MT through the nearby base station (step 612). When receiving the call setup or the page, the mobile terminal MT transmits a response with the temporary identifier $ID_{TEMP7}$ back to the home memory station 101 (step 613). Upon receipt of the response, the home memory station 101 performs the assignment of another temporary identifier $ID_{TEMP8}$ and links the data of the mobile terminal MT with the temporary identifier $ID_{TEMP8}$ in the database (step 614). After that, the home memory station 101 transmits a response confirmation to the mobile terminal MT together with the assigned temporary identifier $ID_{TEMP8}$ (step 615). The assigned temporary identifier $ID_{TEMP8}$ is stored onto the $ID_{TEMP}$ RAM 205 of the mobile terminal MT. In this manner, a temporary identifier is updated to the mobile terminal MT when the mobile terminal MT makes a response to the incoming call.

Further, when the time-out period of the location registration has elapsed, the nearby base station requests the location registration of the mobile terminal MT and thereby the temporary identifier is updated (trigger 406). More specifically, when the location registration time-out period has elapsed, the home memory station 101 instructs the base station to transmit a location registration request to the mobile terminal MT. When receiving the location registration request from the base station, the mobile terminal MT transmits an authentication/location registration request using the present temporary identifier $ID_{TEMP7}$ to the home memory station 101 through the nearby base station 103. When receiving the authentication/location registration request and the temporary identifier $ID_{TEMP7}$, the home memory station 101 performs the authentication/location registration and the assignment of another temporary identifier $ID_{TEMP8}$ and links the data of the mobile terminal MT with the temporary identifier $ID_{TEMP8}$ in the database. After that, the home memory station 101 transmits the assigned temporary identifier $ID_{TEMP8}$ to the mobile terminal MT through the nearby base station. The assigned temporary identifier $ID_{TEMP8}$ is stored onto the $ID_{TEMP}$ RAM 205 of the mobile terminal MT. In this manner, a temporary identifier is updated to the mobile terminal MT when the time-out period of the location registration has elapsed.

Figure 9:
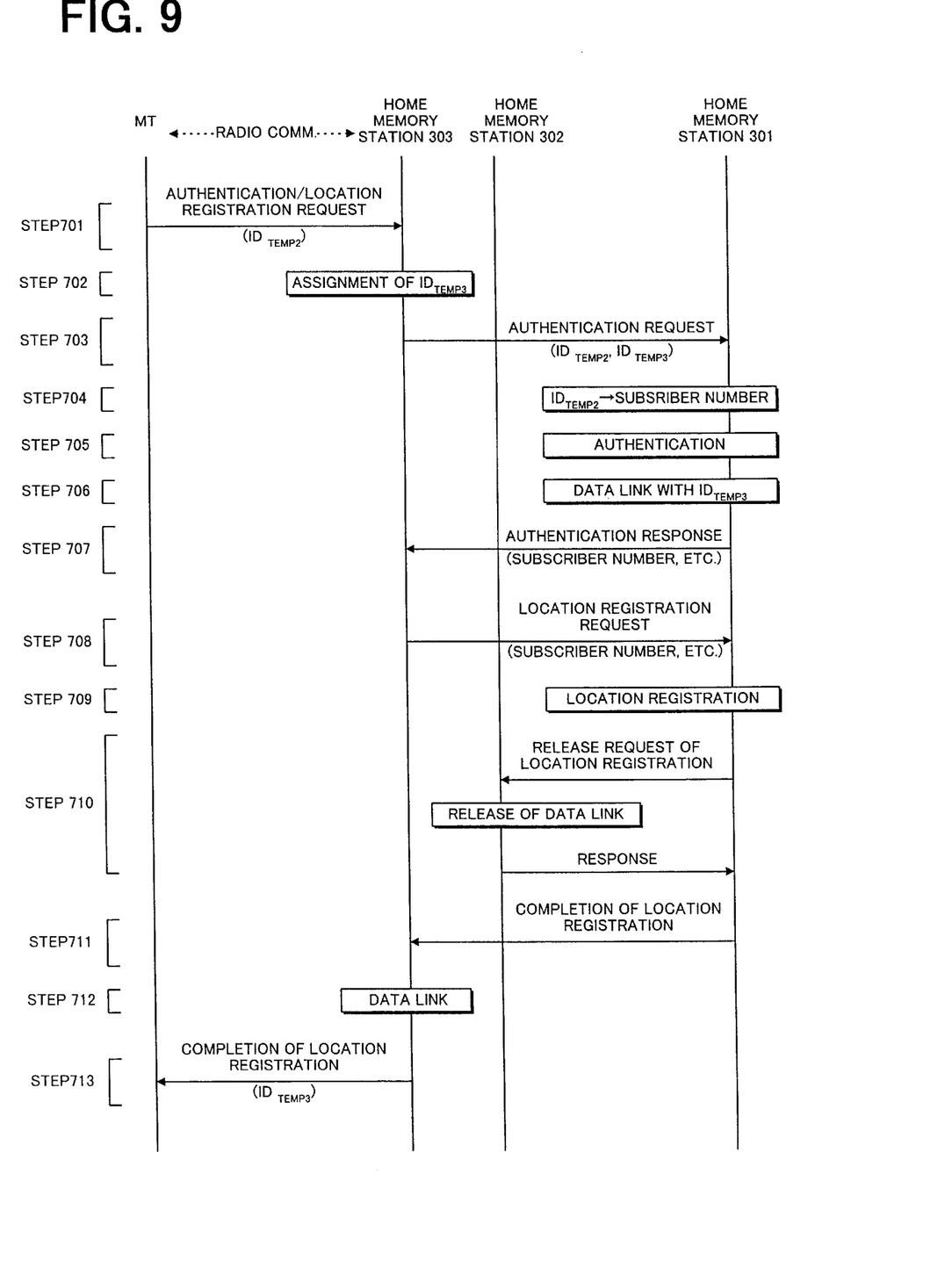
FIG. 9 is a diagram showing a sequence for updating of a temporary identifier when a mobile terminal moves from a visiting network to another visiting network according to a second embodiment of the present invention.

FIG. 9 shows a second embodiment of the present invention. According to this embodiment, the data link between the data of the mobile terminal MT and a temporary identifier is set not only in a visiting home memory station 302 or 303 but also in the home memory station 301 of the home network. Therefore, the authentication and the location registration of the mobile terminal may be performed without the need of requesting the necessary data from the home memory station 302 which the mobile terminal has just left.

Assuming that the temporary identifier $ID_{TEMP2}$ is assigned to the mobile terminal MT in the visiting network of the common carrier B, the mobile terminal MT moves from the visiting network to the other visiting network of the common carrier C (trigger 402 of FIG. 2).

Referring to FIG. 9, when the mobile terminal MT enters the network service area of the common carrier C and detects a change of network service area, the mobile terminal MT transmits the authentication/location registration request using the temporary identifier $ID_{TEMP2}$ to the home memory station 303 of the common carrier C through the nearby base station (step 701). When receiving the authentication/location registration request and the temporary identifier $ID_{TEMP2}$, the home memory station 303 determines whether the temporary identifier $ID_{TEMP2}$ is registered therein. In the case where the temporary identifier $ID_{TEMP2}$ is not registered, the home memory station 303 assigns a new temporary identifier $ID_{TEMP3}$ to the mobile terminal MT (step 702) and then transmits the authentication and data request together with the present temporary identifier $ID_{TEMP2}$ and the new temporary identifier $ID_{TEMP3}$ to the home memory station 301 of the home network through the cable 304 (step 703).

The home memory station 301 searches the database for the subscriber number and the data of the mobile terminal MT according to the temporary identifier $ID_{TEMP2}$ (step 704). Using the retrieved data, the home memory station 301 authenticates the mobile terminal MT (step 705) and links the data of the mobile terminal MT with the new temporary identifier $ID_{TEMP3}$ (step 706), and then transmits the authentication response including the data of the mobile terminal MT to the home memory station 303 (step 707).

When receiving the authentication response, the home memory station 303 transmits the location registration request using the data including the subscriber number to the home memory station 301 (step 708). This causes the home memory station 301 to perform the location registration of the mobile terminal MT (step 709). After that, the home memory station 301 transmits the release request of location registration to the home memory station 302 and, upon receipt of the release request of location registration, the home memory station 302 deletes the data and releases the data link of the temporary identifier $ID_{TEMP2}$ and then transmits the response back to the home memory station 301 (step 710). When receiving the response to the release request of location registration, the home memory station 301 transmits the response indicating the completion of location registration back to the home memory station 303 (step 711).

When receiving the completion notification of location registration, the home memory station 303 links the data of the mobile terminal MT with the new temporary identifier $ID_{TEMP3}$ in the database (step 712). After that, the home memory station 303 transmits the completion notification of location registration and the temporary identifier $ID_{TEMP3}$ to the mobile terminal MT through the nearby base station (step 713). The assigned temporary identifier $ID_{TEMP3}$ is stored onto the $ID_{TEMP}$ RAM 205 of the mobile terminal MT and is normally used to access the visiting network of the common carrier C until updated.

Figure 10:
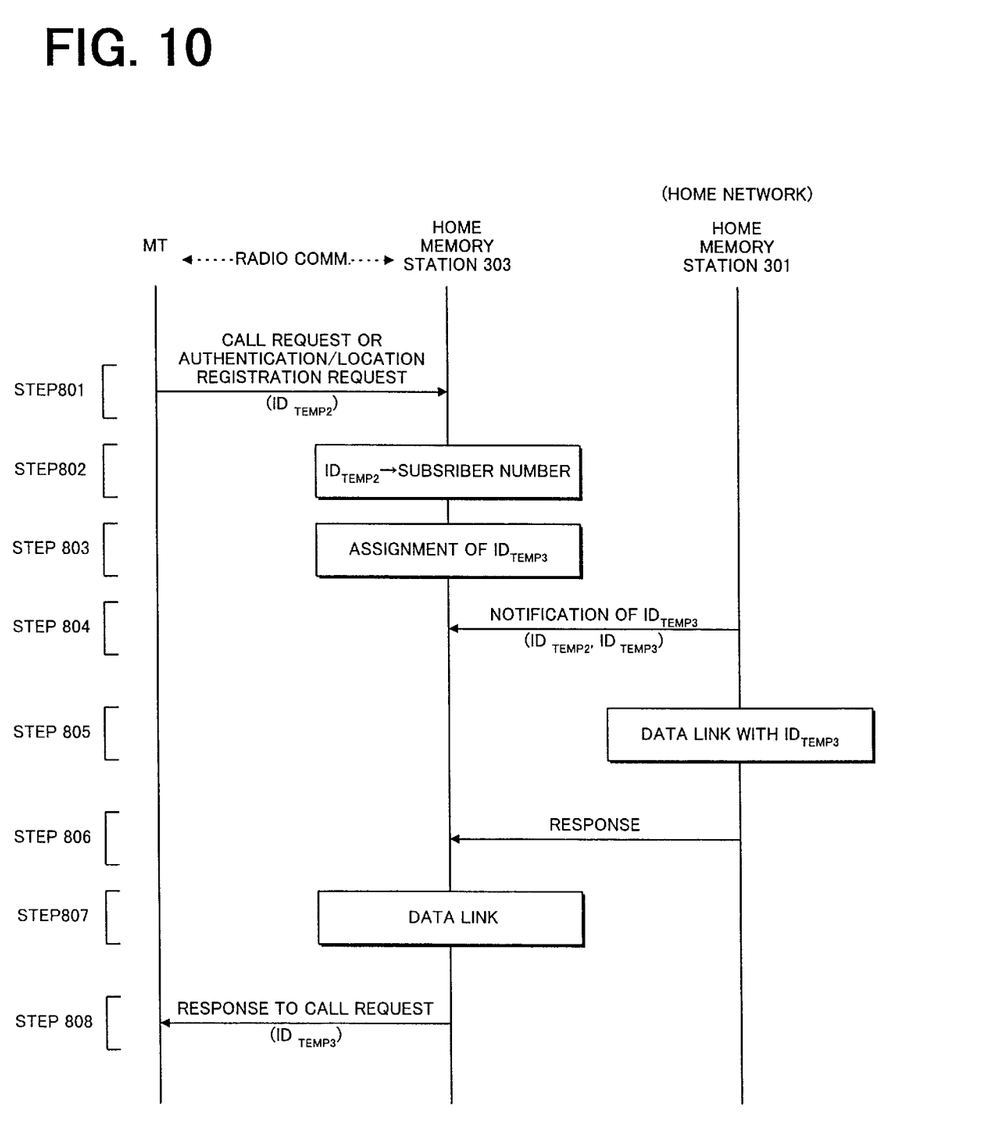
FIG. 10 is a diagram showing a sequence for updating of a temporary identifier when a mobile terminal requests a call according to the second embodiment.

Referring to FIG. 10, when the mobile terminal MT transmits an authentication/call request to the home memory station 303 using the temporary identifier $ID_{TEMP2}$ (step 801), the home memory station 303, using the subscriber number and the data of the mobile terminal MT according to the temporary identifier $ID_{TEMP2}$, authenticates the mobile terminal MT (step 802) and performs the assignment of another temporary identifier $ID_{TEMP3}$ (step 803). After that, the home memory station 303 transmits the notification of the new temporary identifier $ID_{TEMP3}$ together with the present temporary identifier $ID_{TEMP2}$ to the home memory station 301 of the home network through the cable 304 (step 804).

The home memory station 301 links the data of the mobile terminal MT with the new temporary identifier $ID_{TEMP3}$ (step 805), and then transmits the authentication response including the data of the mobile terminal MT to the home memory station 303 (step 806). The home memory station 303 links the data of the mobile terminal MT with the temporary identifier $ID_{TEMP3}$ in the database (step 807) and then transmits a response to the call request with the assigned temporary identifier $ID_{TEMP3}$ to the mobile terminal MT through the nearby base station (step 808). The assigned temporary identifier $ID_{TEMP3}$ is stored onto the $ID_{TEMP}$ RAM 205 of the mobile terminal MT. In this manner, a temporary identifier is updated to the mobile terminal MT when the mobile terminal MT requests a call.

What is claimed is:

1. A method for identifying a mobile station which has a unique identifier assigned thereto, comprising the steps of:
   assigning a temporary identifier to the mobile station, the temporary identifier being different from the unique identifier;
   changing the temporary identifier in response to one of a plurality of predetermined requests transmitted from the mobile station to a network where the mobile station is located; and
   identifying the mobile station using the temporary identifier.

2. The method according to claim 1, wherein the temporary identifier is changed in response to one of a location registration request, a call request, and an incoming call response.

3. The method according to claim 2, wherein the mobile station transmits the location registration request in one of cases where the mobile station enters a different network, where the mobile station enters a different location registration area, and where a location registration time-out period has elapsed.

4. A method for identifying a mobile station according to a temporary identifier which is different from the unique identifier in a plurality of networks of different common carriers including a home network, the mobile station having a unique identifier assigned thereto, comprising the steps of:
   changing the temporary identifier when the mobile station moves from a network to another network;
   changing the temporary identifier when the mobile station transmits a location registration request to a network where the mobile station is located;
   changing the temporary identifier when the mobile station transmits a call request to the network where the mobile station is located; and
   changing the temporary identifier when the mobile station transmits a response to an incoming call to the network where the mobile station is located.

5. The method according to claim 4, wherein the mobile station transmits the location registration request when a location registration time-out period has elapsed.

6. A method for identifying a mobile station in a plurality of networks of different common carriers, each of the networks comprising a plurality of radio base stations and a home memory station which is connected to other home memory stations, the mobile station having a unique identifier assigned thereto, comprising the steps of:
   at the mobile station,
      a) transmitting a predetermined signal including a first temporary identifier to a radio base station connected to a first home memory station, the first temporary identifier being assigned to the mobile station and being different from the unique identifier;
   at the first home memory station,
      b) changing the first temporary identifier to a second temporary identifier in response to the predetermined signal received from the mobile station, wherein the first home memory station receives data of the mobile station including the unique identifier from a second home memory station of the home network to link the data of the mobile station with the second temporary identifier when the first temporary identifier is not registered in the first home memory station;
      c) transmitting the second temporary identifier back to the mobile station to communicate with the mobile station using the second temporary identifier; and
      d) identifying the mobile station according to the second temporary identifier when receiving a signal with the second temporary identifier from the mobile station.

7. The method according to claim 6, wherein the predetermined signal is one of a location registration request, a call request, and an incoming call response.

8. The method according to claim 7, wherein the mobile station transmits the location registration request in one of cases where the mobile station enters a network of the home memory station from another network, where the mobile station enters a different location registration area in the network of the home memory station, and where a location registration time-out period has elapsed in the network of the home memory station.

9. The method according to claim 6, wherein, in the step b), the first home memory station transmits a data request including the first temporary identifier to the second home memory station of the home network; and the second home memory station of the home network retrieves the data of the mobile station according to the first temporary received from the first home memory station and transmits the data of the mobile station to the first home memory station.

10. The method according to claim 6, wherein, in the step b), the first home memory station transmits a first data request including the first temporary identifier to the he second home memory station of the home network;

the second home memory station of the home network transmits a second data request to a third home memory station which assigned the first temporary identifier to the mobile station before the mobile station enters the first home memory station;

the third home memory station retrieves the data of the mobile station according to the first temporary received from the second home memory station and transmits the data of the mobile station to the second home memory station; and the second home memory station transmits the data of the mobile station to the first home memory station.

11. A mobile communications system comprising a plurality of networks and a plurality of mobile stations, each of the networks comprising a home memory station which is connected to other home memory stations, each mobile station comprising:

a memory for storing a subscriber number and a first temporary identifier which are different from each other;

a radio transceiver for communicating with a first home memory station through a nearby radio base station using the first temporary identifier; and a first controller for updating the memory by changing the first temporary identifier to a second temporary identifier received from the first home memory station, and the first home memory station comprising:

a database for storing data of mobile terminals registered therein; and a second controller for updating the database by changing the first temporary identifier to the second temporary identifier in response to a predetermined signal received from the mobile station through the nearby radio base station, transmitting the second temporary identifier back to the mobile station to communicate with the mobile station using the second temporary identifier, and identifying the mobile station according to the second temporary identifier when receiving a signal with the second temporary identifier from the mobile station, wherein the database receives data of the mobile station including the subscriber number from a second home memory station of the home network and links the data of the mobile station with the second temporary identifier when the first temporary identifier is not registered in the database.

12. The mobile communications system according to claim 11, wherein the predetermined signal is one of a location registration request, a call request, and an incoming call response.

13. The mobile communications system according to claim 12, wherein the mobile station transmits the location registration request in one of cases where the mobile station enters a network of the home memory station from another network, where the mobile station enters a different location registration area in the network of the home memory station, and where a location registration time-out period has elapsed in the network of the home memory station.

14. The mobile communications system according to claim 11, wherein the second controller transmits a data request including the first temporary identifier to the second home memory station of the home network and receives the data of the mobile station from the second home memory station.

15. A mobile station comprising:

a first memory for storing a unique identifier which was previously assigned to the mobile station;

a second memory for storing a first temporary identifier which is different from the unique identifier;

a radio transceiver for communicating with a home memory station through a nearby radio base station using the first temporary identifier stored in the second memory; and a processor for updating the second memory by changing the first temporary identifier to a second temporary identifier received from the home memory station.

16. In a mobile communications system comprising a plurality of networks and a plurality of mobile stations, each of the networks comprising a home memory station which is connected to other home memory stations, and each of the mobile stations having a home network and having a subscriber number assigned thereto, each home memory station comprising:

a database for storing data of mobile terminals registered therein; and a controller for updating the database by changing a first temporary identifier to a second temporary identifier in response to a predetermined signal received from a mobile station through a nearby radio base station, transmitting the second temporary identifier back to the mobile station to communicate with the mobile station using the second temporary identifier, and identifying the mobile station according to the second temporary identifier when receiving a signal with the second temporary identifier from the mobile station, wherein the database receives data of the mobile station including the subscriber number from a home memory station of the home network and links the data of the mobile station with the second temporary identifier when the first temporary identifier is not registered in the database.

* * * * *